United States Patent
Sayegh

Patent Number: 6,036,069
Date of Patent: *Mar. 14, 2000

[54] BICYCLE FORK ATTACHMENT

[76] Inventor: Jeffrey Dennis Sayegh, 6189 Birdie Dr., La Verne, Calif. 91750

[*] Notice: This patent issued on a continued prosecution application filed under 37 CFR 1.53(d), and is subject to the twenty year patent term provisions of 35 U.S.C. 154(a)(2).

[21] Appl. No.: 09/107,800

[22] Filed: Jun. 30, 1998

[51] Int. Cl.$^7$ ...................................................... B60R 9/10
[52] U.S. Cl. ............................................ 224/324; 224/924
[58] Field of Search .................................... 224/924, 324, 224/405, 403, 309; 301/110.5; 70/233; 280/188.4, 293; 211/5, 17, 18, 19, 20, 21, 22; D12/408, 407

[56] References Cited

U.S. PATENT DOCUMENTS

| | | |
|---|---|---|
| 611,709 | 10/1898 | Sapp . |
| 4,717,055 | 1/1988 | San Juan .................................. 224/405 |
| 5,232,237 | 8/1993 | Patrick . |
| 5,265,897 | 11/1993 | Stephens . |
| 5,417,629 | 5/1995 | Phipps . |

FOREIGN PATENT DOCUMENTS 2 332 155  6/1977  France .................................... 224/324

*Primary Examiner*—Linda J. Sholl
*Attorney, Agent, or Firm*—Joseph E. Mueth

[57] ABSTRACT

An adapter device for transporting a bicycle having a through axle fork on a fork mount-type holding/transporting system. The adapter device has a hollow tubular cross member adapted to be received between the two spaced apart fork portions of the bike, the cross member being adapted to receive a rod, such as the through axle of the bike, and to be held onto the fork by fastening means. Projecting at about a right angle from the exterior of and near each end of the cross member is a clevis like side member, the free end of which has a U-shaped notch for receiving a transverse rod provided with threaded ends normally present on the mount-type bicycle holding/transporting system. The threaded ends are adapted to receive fastening means for securing the adapter device to the transporting system.

2 Claims, 1 Drawing Sheet

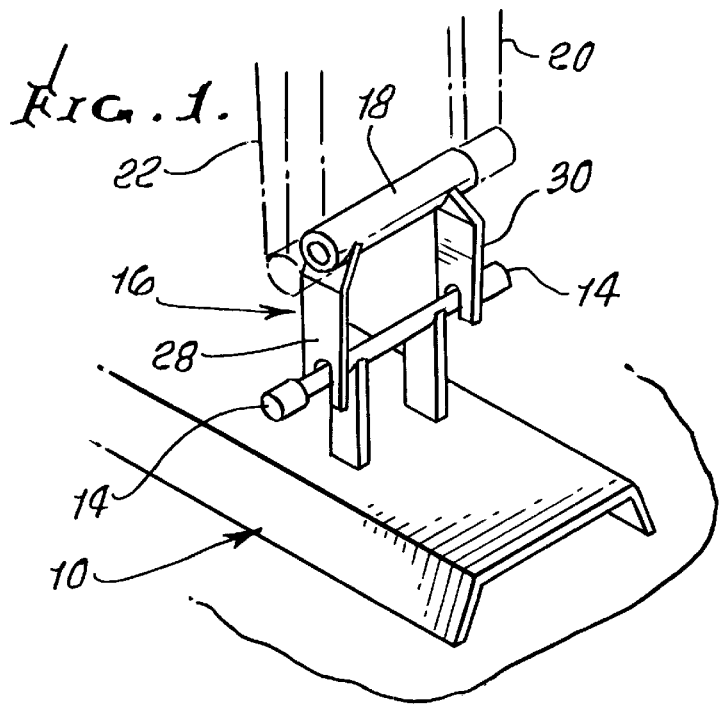
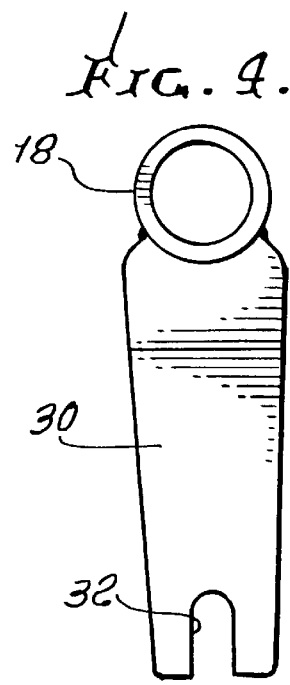
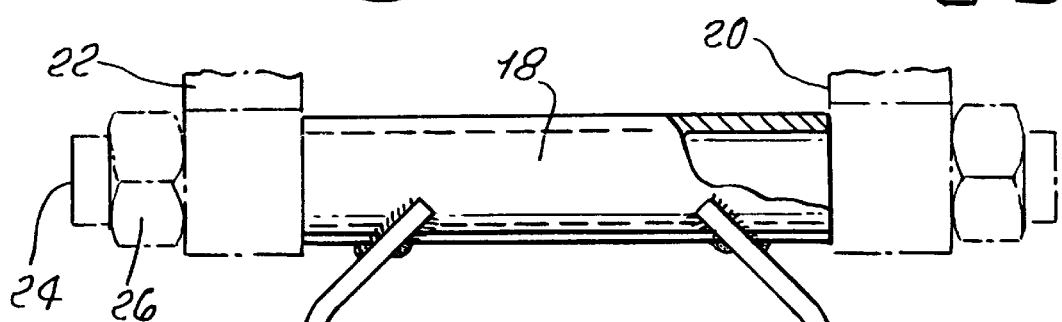
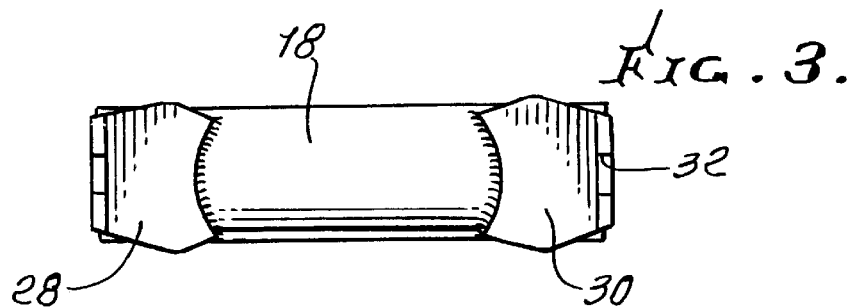

BICYCLE FORK ATTACHMENT

FIELD OF INVENTION

This invention relates to an extension device for attachment to the end of the fork of a through axle or mountain bicycle fork to facilitate attachment of the bicycle to a bike rack after removal of the front wheel.

BACKGROUND OF THE INVENTION

The typical bicycle has a fork which is open or notched at the bottom or free end of both sides. The front wheel, hub, bearings and axle are first assembled as one. The axle is threaded at each end. The axle assembly carrying the front wheel is then slidably received in the U-shaped notched open ends of the fork and nuts are engaged on the threads to hold the wheel on the fork.

This type of fork, sometimes referred to as a pair of clevises each with a pair of arms, is adapted to be received on bike racks or carriers usually positioned on the roof of an automobile or in the bed of a truck. The carrier is adapted to hold the bike in an upright vertical position. The wheel of the bike is first removed by loosening the nuts and the fork is slipped over the carrier which has a transverse rod or skewer assembly having threaded ends. The fork is positioned on the rod in much the same way as the front wheel axle fits in the open ends of the fork. The nuts are made up on the threaded ends of the rod securing the bike.

All of the foregoing is prior art. See, for example, Stephens, U.S. Pat. No. 5,265,897.

This arrangement is not suitable for many down hill trail bikes which are used on extremely rough terrain. The pounding and distortion produced under downhill trail biking conditions can result in the loosening of the front wheel, with dire consequences. Consequently, in such bikes, the fork is not open at its free ends, that is, there is no U-shaped notch or spaced apart arms in either clevis. Instead, the fork has closed free ends with round through holes formed or drilled therein for receiving the front axle. The front axle is slid through the holes and front wheel hub after the wheel has been positioned between each side of the fork.

This presents a problem since such downhill or trail bicycles are incompatible with the standard bike rack or carrier in which the fork end is received over a rod or skewer assembly.

The present invention pertains to an extension for the through axle or mountain bike forks so that it can be carried on the same bike rack or carrier as is used for bikes having notched open end forks.

SUMMARY OF INVENTION

Briefly, my invention relates to an adapter device for attachment to a bicycle equipped with a through axle fork comprising a hollow tubular cross member having two spaced apart side projections each of which terminate in an end having a generally U-shaped notch or opening.

More particularly, the invention comprehends an adapter device for transporting a bicycle having a through axle fork on a fork mount-type holding/transporting system, said adapter device comprising a hollow tubular cross member adapted to be received between the two spaced apart fork portions of the bike, the cross member being adapted to receive a rod, such as the through axle of the bike, and to be held onto the fork by fastening means, projecting at about a right angle from the exterior of said cross member, a pair of clevis like side members, the free end of which of said side members having a U-shaped notch for receiving a transverse rod provided with threaded ends normally present on the mount-type bicycle holding/transporting system.

The invention further includes the combination of the adapter device with the downhill or trail bicycle.

Still further, the invention also includes the combination of the adapter device, bicycle and holding/transporting system.

DESCRIPTION OF PREFERRED EMBODIMENTS

Turning to the drawings:

FIG. 1 is a partial perspective view showing the lower end of the mountain bike fork with the extension of this invention attached thereto and with the clevis like side members being received over the mounting rod of the illustrative roof-type carrier.

FIG. 2 is a front elevation of the extension of this invention.

FIG. 3 is a bottom plan view of the extension of this invention.

FIG. 4 is a side elevation of the extension of this invention.

Considering the drawings in greater detail, the illustrative fork mount-type holding transporting system comprises a bike carrier 10 which is attached to the roof of an automobile or the bed of a truck by known means. The typical carrier has a transverse rod or skewer assembly 12 having externally threaded ends provided with nuts 14.

The attachment device 16 of this invention has a hollow tubular cross member 18 which is of a length such that it can be received between the two spaced apart, closed end mountain bike fork portions 20 and 22 of the bike.

The cross member 18 is adapted to receive a rod or axle 24. With the spaced apart closed end fork portions 20 and 22 in place over rod 24, as shown in FIG. 2, the entire attachment 16 is secured to the bike by tightening the nuts 26 on the threads ends of rod 24. It will be understood by those skilled in the art that the entire attachment 16 can be attached to or held by the fork by a variety of fastening means. For instance, on some forks, the axle is slidably received in one fork portion and is threadably received in the other fork portion. Other auxiliary fastening means involving fork and axle are known and are intended for use with the attachment 16.

The attachment 16 has side projections 28 and 30 extending at about a right angle from cross member 18. Each of these right angle projections or side pieces has a U-shaped opening or notch 32 at its free end. The openings 32 are of a size to receive the rod 12. The attachment 16 is held to rod 12 by nuts 14.

Many variations are possible. The attachment device 16 preferably is in the form as shown such that the length and diameter of the cross member 18 can, in production, be varied to suit various sizes of mountain bike forks. The side members 28 and 30 cradle cross member 18 and are welded to the cross member 18.

The following claims are intended to particularly point out distinctly claim the invention.

What is claimed is:

1. An adapter device for transporting a bicycle on a fork-mount type holding and transportation system, said bicycle having a through axle fork having two spaced apart fork portions, said adapter device comprising a hollow tubular cross member, side members protecting at essentially right angles from each end of said cross member, each side member terminating in a free end, each said free end having a generally U-shaped notch therein for receiving a transverse rod having threaded ends which forms part of the mount-type holding and transportation system, the hollow tubular cross member of the said adapter device being adapted to be received between the said two spaced apart fork portions of said bicycle fork and said adapter device being further adapted to be held onto a bicycle fork by a rod received within and extending through said hollow cross member which rod has threaded ends provided with fastening means to secure said adapter device to said bicycle fork.

2. The device of claim 1 in further combination with a bicycle carrier.

* * * * *